United States Patent [19]

Schott et al.

[11] Patent Number: 5,014,318
[45] Date of Patent: May 7, 1991

[54] APPARATUS FOR CHECKING AUDIO SIGNAL PROCESSING SYSTEMS

[75] Inventors: Hartmut Schott; Dieter Seitzer, both of Erlangen; Heinz Gerhäuser, Waischenfeld; Karlheinz Brandenburg, Erlangen; Ernst Eberlein, Erlangen; Stefan Krägeloh, Erlangen; Rolf Kapust, Erlangen; Harald Popp, Tuchenbach, all of Fed. Rep. of Germany

[73] Assignee: Fraunhofer Gesellschaft zur Förderung der angewandten Forschung e. v., Fed. Rep. of Germany

[21] Appl. No.: 439,394
[22] PCT Filed: Feb. 25, 1989
[86] PCT No.: PCT/DE89/00110
  § 371 Date: Oct. 25, 1989
  § 102(e) Date: Oct. 25, 1989
[87] PCT Pub. No.: WO89/08357
  PCT Pub. Date: Sep. 8, 1989
[51] Int. Cl.$^5$ .............................................. G10L 5/00
[52] U.S. Cl. ........................................ 381/47; 73/585; 381/68.2; 128/746
[58] Field of Search ............... 381/47, 68.2, 68.4; 128/746; 73/585

[56] References Cited

U.S. PATENT DOCUMENTS 3,786,188  1/1974  Allen ........................................ 381/47
4,548,082  10/1985 Engebretson ........................ 128/746
4,577,641  3/1986  Hockmair et al. ..................... 73/585
4,637,402  1/1987  Adelman .............................. 381/68.2

OTHER PUBLICATIONS

Walters, "Microprocessor Controlled Measurement System for Speech Codes", IEEE on Instrumentation and Measurement, Band IM-31, Nr. Mar. 1, 1982, pp. 12-17.

Primary Examiner—E. S. Kemeny
Attorney, Agent, or Firm—Evenson, Wands, Edwards, Lehanan & Mckeown

[57] ABSTRACT

Disclosed is an apparatus for checking audio signal processing systems. The apparatus has the following features:
the apparatus is provided with a first input connection, to which the input signal of the audio processing system to be checked is transmitted, a second input connection, to which the output signal of said system is transmitted, and a signal processor.
said signal processor ascertains the signal delay time of said system to be checked by means of correlating said signals received at said two input connections,
said signal processor always composes the difference signal from said signal received at said first input connection during a specific time span and said signal received at said second input connection, lagging by the signal delay time,
said signal processor ascertains the spectral composition of said signal received at said first input connection during said specific time span and of said respective difference signal,
said signal processor ascertains the hearing threshold of the human ear from said spectral composition and compares the ascertained hearing threshold with the respective difference signal.

22 Claims, 1 Drawing Sheet

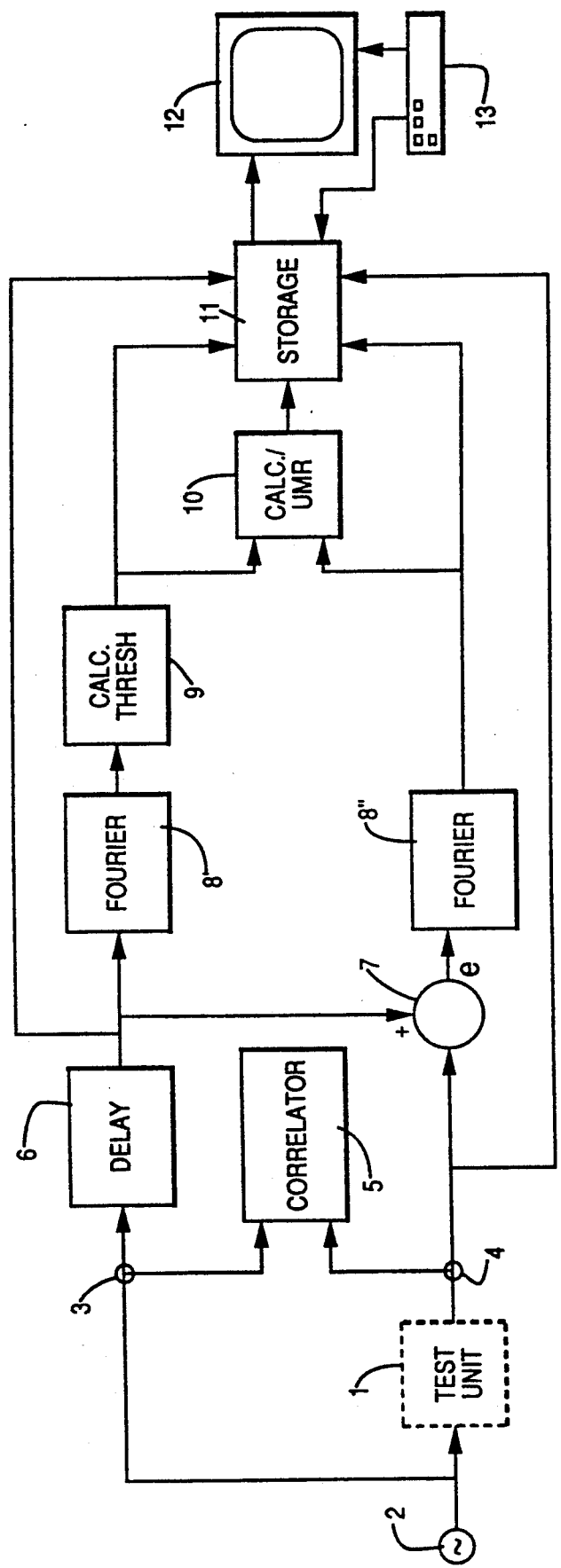

APPARATUS FOR CHECKING AUDIO SIGNAL PROCESSING SYSTEMS

DESCRIPTION

1. Technical Field of the Invention

The present invention relates to an apparatus for checking audio signal processing systems.

In processing audio signals, by way of illustration in digital coding for data reduction, in reproducing recorded signals via loudspeakers, etc., errors occur, i.e. the processed audio signal deviates from the original audio signal. Such deviations are partially audible, partially inaudible due to the characteristics of the human sense of hearing.

Particularly, the new processes of encoding audio signals make use of the characteristics of the human sense of hearing: only those parts of the signal are transmitted exactly that the human ear can readily hear. The spectral composition of the "error or disturbance" resulting from the "inexact" transmission is influenced in such a manner that is inaudible or barely audible. High compression degrees of 80% to 90% desired for digital transmission of audio signals, by way of illustration via digital radio stations or for digital storage, can be achieved only by this means.

2. State of the Art

If pieces of music are digitally encoded for data reduction and subsequently decoded, by means of conventional measuring processes, such as S/N measurements (measurement of the signal/noise ratio) or harmonic distortion coefficient measurements, considerable disturbing signal—respectively error—portions are measured, which, however, in practice are usually inaudible.

Simple frequency evaluations such as dB(A) do not take, in particular, masking effects into consideration. Ascertaining the "error signal" by means of elaborate frequency evaluations without taking the physiological sense of hearing into account or determining the THD factor (total harmonic distortion) does not give any distinct indication of the quality of the encoding algorithm so that hitherto encoding algorithms could only be evaluated by means of extensive hearing tests.

DESCRIPTION OF THE INVENTION

The object of the present invention is to provide an apparatus for checking audio signal processing systems, which will allow quantitative determination of the audibility of disturbing signals.

A solution, in accordance with the present invention, of the aforegoing object and its further embodiments are set forth in the claims hereto: an element of the present invention is that the apparatus is provided with a first input connection to which the input signal from the audio signal processing system to be checked is transmitted, a second input connection, to which the output signal of said system is transmitted, and a signal processor. The signal processor ascertains the signal delay time of the system to be checked by means of correlating the signals received at both input connections in such a manner that an "output signal" and the respective audio signal processed by the system to be checked are always compared.

In accordance with the embodiment described in claim 1 hereto, the signal processor always composes the difference signal from the signal received at the first input connection during a specific time span, by way of illustration approximately 10 ms, and the signal received at the second input connection, lagging by the signal delay time, and ascertains the spectral composition of the signal received during the specific time span at the first input connection and of its respective difference signal.

In accordance with the embodiment described in claim 2 hereto, the signal processor ascertains the spectral composition of the signal received during the specific time span (again, by way of illustration, approximately 10 ms) at the first input connection and of the signal received at the second input connection, lagging by the signal delay time, and always composes the difference signal of the spectral compositions of the signal received during the specific time span at the first input connection and of the signal received at the second input connection, lagging by the signal delay time.

In the case of both embodiments, the signal processor subsequently ascertains the hearing threshold of the human ear from the spectral composition of the signal received at the first input connection and compares the ascertained hearing threshold with the respective difference signal. A corresponding evaluation of the audio signal processing is then possible on the basis of this comparison.

With regard to the course of the hearing threshold, by way of illustration, reference is made to the book *Elektro-akustik*, E. Zwicker, M. Zollner, Springer Verlag, Berlin-Heidelberg, 1984, 1987.

At any rate, the invented apparatus permits an objective and quantitative determination of changes (data reduction, transmission errors, sound influences, etc.) in the audio signal stemming from the system to be checked. Elaborate, subjective hearing tests are supplemented in this manner or even made unnecessary. Moreover, the invented apparatus provides a gauge for the safety ratio of "errors" to the audibility threshold.

The objective, measured values of the influence on audio signals stemming from the processing and/or transmission systems provided by the invented apparatus can be utilized, by way of illustration, for comparing different transmission channels or for quantitatively determining improvements or deteriorations in the development. However, the invented apparatus can also be used to supplement subjective hearing tests: by way of illustration, critical passages of music may be ascertained beforehand and then utilized for a hearing test.

The invented apparatus does not require special test signals, such as, by way of illustration, sinus signals, but rather any piece of music may be employed as a test signal so that an audio channel, respectively a system for processing audio signals, is tested in "normal use".

Further embodiments of the present invention are set forth in the claims 2 to 12:

According to claim 3 hereto, "signal energies" are evaluated in order to ascertain the hearing threshold. For this purpose, the signal processor ascertains the respective signal energy of the signal received at the first input connection by means of squaring the amplitude occurring in specific frequency ranges and calculates the masking audibility threshold from the signal energy.

An element of the present invention is that, in order to reflect the physiological sense of hearing, the masking effects, in particular, are taken into consideration: meant is that disturbing signals, the level of which is greater than the so-called rest-disturbing threshold, can be covered, respectively masked, by dominant parts of the signal, thus not only the absolute level of the disturbing signal in comparison to the base, respectively the rest audibility threshold are decisive for the audibility of disturbances, but also their frequency position in relation to the dominant parts of the signal.

For this reason, according to claim 4 hereto, the signal processor establishes the masking audibility threshold as the hearing threshold if the base audibility threshold (rest audibility threshold) in the respective frequency range is smaller than the masking audibility threshold.

Accordingly, the signal processor, as set forth in claim 5 hereto, establishes the base threshold of audibility as the hearing threshold if the base threshold in the respective frequency range is greater than the masking audibility threshold.

In order to objectify the measured values, the signal processor composes the NMR value (noise-to-mask ratio) for each frequency range, yielded by $$NMR = \log (F_E/M_E)$$

whereby $F_E$ is the energy of the error signal in this frequency range and $M_E$ is the energy of the hearing threshold in this frequency range (claim 6). The NMR value represents a measure of the audibility of the individual disturbances in the respective frequency range. Negative values are a gauge for the "safety ratio" of the disturbance to the audibility barrier.

As the invented apparatus permits the real-time checking of an audio signal processing system, it is preferable if the apparatus, as described in claim 7 hereto), is provided with a display unit, which shows the current value of the NMR value for each frequency range. A display unit of this type, which, by way of illustration, shows the values in the respective frequency range, under circumstances, even in the form of colored bars, permits constant visual control of the audio signal processing. Of course, it is, however, also possible to only read out the calculated values, which are a measure for the disturbance values on the basis of the audio signal processing, by way of illustration, to a subsequent processing unit.

In addition to calculating, reading out and/or displaying the present values for each frequency range, the signal processor can also ascertain the NMR value ascertained for each frequency range over several time ranges and/or frequency ranges (claim 8):

In particular, the mean value over all the frequency ranges is of significance here as it represents a gauge for the "loudness" of the disturbance.

Furthermore, it is, by way of illustration, of significance for the evaluation of a data reduction algorithm how often audible disturbances occur (masking flag). Therefore, as described in claim 9 hereto, an element of the present invention is that the signal processor determines how often the error signal crosses the hearing threshold in a specific frequency range.

Moreover, as set forth in claim 10 hereto, in some cases it may be advantageous if the signal processor also ascertains the signal/noise ratio. Under circumstances, it may also be useful if the invented apparatus, by way of illustration, represents the frequency spectrum of the original signal in addition to the spectrum of the error signal as this would give the operator additional indication as to the origin of the disturbance.

Preferably, the individual, determined values are stored cyclically in a memory so that, by way of illustration, the operator can stop stored values from being written over by the most current values, and the stored values are preserved (claim 11). Of course, all the values may, however, also be recorded non-volatilely and analyzed later with greater resolution.

The invented apparatus is suited for checking any audio signal processing system and can, by way of illustration, be utilized for evaluating data reduction algorithms, for ascertaining audible disturbances stemming from transmission errors, for assessing distortion in audio channels, such a loudspeakers or amplifiers.

It is particularly preferable, if the signal processor processes the data digitally (claim 12). In this case, for the conversion, under circumstances, of analogously received signals, analogue/digital converters are connected ahead of the input connections.

The digital signal processor preferably converts the "time signal" into the "spectral signal" by means of the discrete Fourier transformation (DFT, respectively FFT).

BRIEF DESCRIPTION OF THE DRAWING

The present invention is made more apparent in the following section using a preferred embodiment with reference to the accompanying drawing, whose single FIGURE depicts a block diagram (function block diagram) of an invented apparatus.

DESCRIPTION OF THE PREFERRED EMBODIMENT

The single FIGURE shows a block, respectively a function, block diagram of an invented apparatus for checking an audio signal processing system 1, by way of illustration a system for reducing data of the signal from a signal source 2, by way of illustration a CD player.

The apparatus is provided with two input connections 3 and 4. The input signal from the system to be checked 1, thus the output signal from signal source 2, is transmitted to input connection 3. The output signal from system 1 is transmitted to the input connection 4. In the case of a system for data reduction, the signal transmitted to connection 4 is the signal first encoded and subsequently decoded again by system 1.

The input connections 3 and 4 of the apparatus are connected to a signal processor, which in the case of the preferred embodiment is a digital signal processor, and the function of which—not necessarily its construction—is illustrated by the individual blocks in the accompanying drawing.

By correlating the signals received at the two input connections 3 and 4 in a correlator 5, the operating time, respectively the signal delay, of system 1 for processing, respectively transmitting, audio signals are determined. The correlator 5 transmits signals, corresponding to the ascertained delay, to an operating time element 6, which delays the audio signal received at input connection 3—not processed by the system 1—by the signal delay time span delayed in system 1 in such a manner that in the subsequent processing steps, "corresponding" signals are always compared at connections 3 and 4.

The signal received at input connection 4 is subtracted in a subtracter 7 from the delayed signal received at input connection 3. The difference signal, i.e. the output signal from subtracter 7, and the signal received at connection 3 are subsequently Fourier transformed in transformation units 8', respectively 8''. The hearing threshold yielded under physiological aspects is calculated in an arithmetic unit 9 from the Fourier-transformed signal 3.

Subsequently, the NMR value (noise-to-mask ratio) is calculated for each frequency range in block 10, yielded by $$NMR = \log (F_E/M_E)$$

whereby $F_E$ is the energy of the error signal in this frequency range and $M_E$ is the energy of the hearing threshold in this frequency range.

The NMR value represents a measure for the audibility of the individual disturbances in the respective frequency range. Negative values are a gauge for the "safety ratio" of the disturbance to the audibility barrier.

The NMR value and the Fourier spectra of the original signal 3 and of the difference signal and the original "time signals", received at connections 3 and 4, are stored in a memory 11 and shown on a display unit 12. The foregoing is symbolized in the accompanying drawing by means of corresponding "network connections".

Furthermore, a keyboard 13 is provided for the purpose of controlling and operating the functions of the signal processor.

The mode of operation of the invented apparatus is described in the following section:

The entire operation can be divided into four part functions:

determination of the error signal, calculation of the spectra of the original signal and the error signal, calculation of the hearing thresholds and the NMR value, display, further processing and/or storage of the results.

In the embodiment described in the preceding section, the difference between sampled values of the original and the encoded/decoded signals are taken for the error signal. For this purpose, the sampled values of both signals—under circumstances following analogue/digital conversion—are transmitted to input connections 3 and 4. In order to compose the difference between the corresponding sampled values, first the delay of the system to be examined 1 is ascertained by the correlator 5 and delayed corresponding to the ascertained delay of the original signal in the delay section 6. In this part function, trivial changes in the signal (inversion, amplification, etc.) may also be made.

Subsequently the short time spectra of the original signal and the difference signal are determined. For this purpose, by way of illustration, a fast Fourier transformation (FFT) with a length of 1024 is employed. The analysis occurs in the illustrated embodiment with 100% overlapping, i.e. every 512 sampled values, the FFT of 512 preceding and 512 new samples values are determined. In order to improve the analysis characteristics of the FFT, a Hanning window may be employed: this means that a new spectrum comes every 11.6 ms (sampled frequency 44.1 kHz).

In preparation of the arithmetic steps in the third part, the logarithmetized amplitude spectrum is also calculated, which may also be displayed so that the invented apparatus can also be employed for real-time spectral analysis.

Thereupon follows the actual physio-acoustical evaluation, where the hearing thresholds are determined and subsequently the "noise-to-mask ratio" (NMR) is calculated from the aforegoing equations. In order to determine the hearing thresholds, it may, by way of illustration, be proceeded as follows:

The transformed spectrum is comprised into frequency groups by adding up several lines of the initially linear frequency axis in a Bark scale-like separation and divided by the number of added lines. By way of illustration, in the described embodiment, 27 frequency groups are formed. The hearing thresholds are calculated on the basis of this rough course of the spectral composition.

In the first stage, the masking in the specific frequency group is calculated. The calculation of the masking of the adjacent groups occurs with the aid of—by way of illustration ascertained empirically—tables, in which the amount of masking for the adjacent frequency bands is recorded. The calculated hearing threshold is subsequently compared with the rest audibility threshold. If the masking is less than the rest audibility threshold, the latter is taken as the hearing threshold.

As the rest audibility threshold is coupled with the lising volume, in the described embodiment, the smallest signal that can still be represented with a quantization of 16 bit is defined as the rest audibility threshold, i.e. the rest audibility threshold is gauged if the listening threshold is adjusted in such a manner that these signals are just audible.

The forgoing yields a course of the current hearing threshold, which is approximated by means of a step function. This hearing threshold is then applied to the error signal. For this purpose, the error signal is also transformed in the frequency range and separated into the same frequency groups.

The energy content of each frequency band is put into relation to the calculated audibility threshold, and for this purpose the aforecited NMR value is calculated for the individual frequency bands. As the logarithmic gauge, the NMR value indicates the ratio of the disturbing signal, respectively error signal, to the audibility threshold in this band. If the so-called masking condition is violated, i.e. if the error signal is greater than the audibility threshold in this band, the so-called "masking lag" is set, which indicates that a disturbance is audible in this band.

The average disturbance to masking threshold ratio and the number of masking flag postings per time unit give an important indication of the quality of the audio signal processing, by way of illustration, thus of the quality of the coding.

The current NMR values and the corresponding spectra are shown on the display unit 12, by way of illustration in the form of bar diagrams on a screen, so that the display can be watched while listening to the music.

The display can be stopped by means of keyboard 13 so that the last 5–10 seconds (depending on the resolution of the display) can be analyzed exactly.

In addition, the mean values of the NMR values in the individual frequency groups, over the individual frequency groups, the signal-to-noise ratio (SNR), the SNR value in the individual frequency groups, the best and worst values within an adjustable period of time and the relative frequency of masking flag postings can also be calculated.

In the preceding section, the present invention has been described using a preferred embodiment without the intention of limiting the scope of the overall inventive concept, within which there are, of course, most varied possible modifications and alterations:

By way of illustration, the transformation in the "spectral range" and the composition of the difference between the two signals received at input connections 3 and 4 may also be exchanged: thus it is possible to first transform the signals received at input connections 3 and 4 in the "frequency range" and subsequently compose the difference between the two signals.

Other functions may also be employed as transformation functions, by way of illustration the discrete Fourier transformation (DFT).

It is expressly pointed out that: the individual processing steps are represented in the accompanying drawing as "function blocks" solely for the purpose of facilitating understanding. This does not mean that the signal processor has to have such "blocks" as discrete modules, but rather it is, of course, possible to use one—or, in order to increase the speed of processing, several—freely programmable signal processors, which, by way of illustration, realize the operation time element by intermediate storage of the individual digital values.

What is claimed is:

1. An apparatus for checking an audio signal processing system comprising:
   first input means for receiving an input signal to an audio processing system to be checked;
   second input means for receiving an output signal of the audio processing system to be checked;
   correlator means for determining an operating time of the audio processing system and determining a signal delay time therebetween;
   time delay means for delaying the input signal by the operating time of the audio processing system to produce a delayed input signal;
   signal subtraction means for subtracting the output signal of the audio processing system for the delayed input signal to produce a difference signal for a given time interval;
   spectral analysis means for ascertaining the spectral composition of the input signal and the difference signal for the given time interval;
   hearing threshold determining means for determining an ascertained hearing threshold of a human ear from the spectral composition of the input signal for the given time interval; and
   comparator means for comparing the ascertained hearing threshold with the difference signal for the given time interval to provide an error signal.

2. An apparatus according to claim 1, wherein, in order to ascertain the hearing threshold, the hearing threshold determining means ascertains a respective signal energy by squaring an amplitude yielded in specific frequency ranges of the first input signal and ascertains a masking audibility threshold from the 3. An apparatus according to claim 2, wherein the hearing threshold determining means establishes the masking audibility threshold as the hearing threshold if a base audibility threshold in a respective frequency range is smaller than the masking threshold.

4. An apparatus according to claim 2, wherein the hearing threshold determining means establishes a base audibility threshold as the hearing threshold if the base audibility threshold in a respective frequency range is greater than the masking audibility threshold.

5. An apparatus according to claim 1, wherein the comparator means further comprises a noise-to-mask determining means for determining a NMR value for each frequency range, which is yielded by $$NMR = \log (F_E/M_E)$$

wherein $F_E$ is the energy of the error signal at each frequency range and $M_E$ is the energy of the hearing threshold at each frequency range.

6. An apparatus according to claim 5, further comprising a display unit, which shows current values of NMR for each frequency range.

7. An apparatus according to claim 6, wherein the noise-to-mask ratio determining means averages the NMR values ascertained for each frequency range over at least one of several time spans and frequency ranges.

8. An apparatus according to claim 1, further comprising means for determining how often said error signal crosses the hearing threshold within a specific frequency range.

9. An apparatus according to claim 1, wherein the comparator further comprising means for ascertaining a signal-to-noise ratio.

10. An apparatus according to one claim 1, wherein individual, ascertained values are stored cyclically in a memory.

11. An apparatus according to claim 1, wherein signal processing occurs digitally and for the conversion of analogously received signals, analogue/digital converters are provided at the input connections.

12. An apparatus for checking an audio signal processing system comprising:
    first input means for receiving an output signal to an audio processing system to be checked;
    second input means for receiving an output signal of the audio processing system to be checked;
    correlator means for determining an operating time of the audio processing system by comparing the input and output signals of the audio processing system and determining a signal delay time therebetween;
    time delay means for delaying the input signal by the operating time of the audio processing system to produce a delayed input signal;
    spectral analysis means for ascertaining the spectral composition of the input signal and the difference signal for the given time interval;
    signal subtraction means for subtracting the spectral composition of the delayed input signal from the spectral composition of the output signal for the given time interval to produce a difference signal;
    hearing threshold determining means for determining an ascertained hearing threshold of a human ear from the spectral composition of the input signal for the given time interval; and
    comparator means for comparing the ascertained hearing threshold with the difference signal for the given time interval to provide an error signal.

13. An apparatus according to claim 12, wherein in order to ascertain the hearing threshold, the hearing threshold determining means ascertains a respective signal energy by squaring an amplitude yielded in specific frequency ranges of the first input signal and ascertains a masking audibility threshold from the signal energy.

14. An apparatus according to claim 13, wherein the hearing threshold determining means establishes the masking audibility threshold as the hearing threshold if a base audibility threshold in a respective frequency range is smaller than the masking threshold.

15. An apparatus according to claim 13, wherein the hearing threshold determining means establishes a base audibility threshold as the hearing threshold if the base audibility threshold in a respective frequency range is greater than the masking audibility threshold.

16. An apparatus according to claim 12, wherein the comparator means further comprises a noise-to-mask determining means for determining a NMR value for each frequency range, which is yielded by $$NMR = \log (F_E/M_E)$$

wherein $F_E$ is the energy of the error signal at each frequency range and $M_E$ is the energy of the hearing threshold at each frequency range.

17. An apparatus according to claim 16, further comprising a display unit, which shows current values of NMR for each frequency range.

18. An apparatus according to claim 16, wherein the noise-to-mask ratio determining means averages the NMR values ascertained for each frequency range over at least one of several time spans and frequency ranges.

19. An apparatus according to claim 12, further comprising means for determines how often said error signal crosses the hearing threshold within a specific frequency range.

20. An apparatus according to claim 12, wherein the comparator means further comprises means for ascertains a signal-to-noise ratio.

21. An apparatus according to one claim 12, wherein individual, ascertained values are stored cyclically in a memory (11).

22. An apparatus according to claim 12, wherein signal processing occurs digitally and for the conversion of analogously received signals analogue/digital, converters are connected at the input connections.

* * * * *